US010519390B2

(12) United States Patent
Ponce de Leon et al.

(10) Patent No.: US 10,519,390 B2
(45) Date of Patent: Dec. 31, 2019

(54) TREATMENT OF COAL

(71) Applicant: Clean Coal Technologies, Inc., New York, NY (US)

(72) Inventors: Ignacio Ponce de Leon, Brooklyn, NY (US); Anton Dilo Paul, Venetia, PA (US)

(73) Assignee: Clean Coal Technologies, Inc., New York, NY (US)

( * ) Notice: Subject to any disclaimer, the term of this patent is extended or adjusted under 35 U.S.C. 154(b) by 262 days.

(21) Appl. No.: 14/891,893

(22) PCT Filed: May 30, 2014

(86) PCT No.: PCT/US2014/040256
§ 371 (c)(1),
(2) Date: Nov. 17, 2015

(87) PCT Pub. No.: WO2014/194208
PCT Pub. Date: Dec. 4, 2014

(65) Prior Publication Data
US 2016/0115412 A1 Apr. 28, 2016

Related U.S. Application Data

(60) Provisional application No. 61/829,006, filed on May 30, 2013.

(51) Int. Cl.
| C10L 9/08 | (2006.01) |
| C10B 53/04 | (2006.01) |
| C10B 57/02 | (2006.01) |
| F23K 1/04 | (2006.01) |
| C10L 5/44 | (2006.01) |
| F23C 1/04 | (2006.01) |
| C10L 5/04 | (2006.01) |
| C10L 5/36 | (2006.01) |

(52) U.S. Cl.
CPC ............... *C10L 9/08* (2013.01); *C10B 53/04* (2013.01); *C10B 57/02* (2013.01); *C10L 5/447* (2013.01); *C10L 9/083* (2013.01); *F23C 1/04* (2013.01); *F23K 1/04* (2013.01); *C10L 5/04* (2013.01); *C10L 5/361* (2013.01); *C10L 2270/00* (2013.01); *C10L 2290/02* (2013.01); *C10L 2290/06* (2013.01); *C10L 2290/08* (2013.01); *C10L 2300/20* (2013.01); *F23K 2201/20* (2013.01); *F23K 2201/501* (2013.01); *Y02E 50/10* (2013.01); *Y02E 50/15* (2013.01); *Y02E 50/30* (2013.01)

(58) Field of Classification Search
CPC .. F23K 1/04; F23K 2201/20; F23K 2201/501; F23C 1/04; F23C 1/12; C10L 19/08; C10L 19/083; F10L 2290/08; F10L 2290/02; C10B 53/04; C10B 57/02; Y02E 50/10; Y02E 50/15; Y02E 50/30

USPC ............................................. 431/2, 287, 356
See application file for complete search history.

(56) References Cited

U.S. PATENT DOCUMENTS

| 1,484,258 | A | | 2/1924 | Fenton |
| 1,975,396 | A | * | 10/1934 | Jenson ................ C10B 21/20 |
| | | | | 202/108 |
| 2,883,948 | A | * | 4/1959 | Seidl ..................... F23C 1/00 |
| | | | | 431/173 |
| 3,800,427 | A | * | 4/1974 | Kemmetmueller ..... C10B 39/02 |
| | | | | 34/363 |
| 4,127,391 | A | | 11/1978 | Koppelman |
| 4,186,669 | A | * | 2/1980 | Cowan ................... F23C 1/12 |
| | | | | 110/106 |
| 4,434,727 | A | | 3/1984 | McCartney |
| 4,561,364 | A | * | 12/1985 | Green ................ F23D 17/005 |
| | | | | 110/261 |
| 4,628,619 | A | * | 12/1986 | Janusch ................. C10F 5/00 |
| | | | | 34/180 |
| 5,645,614 | A | | 7/1997 | Dummersdorf et al. |
| 6,447,559 | B1 | | 9/2002 | Hunt |
| 8,231,696 | B2 | * | 7/2012 | Ruiters ................. C10B 53/00 |
| | | | | 44/500 |
| 9,476,003 | B2 | * | 10/2016 | Hunt ....................... C10L 9/08 |
| 9,879,194 | B2 | * | 1/2018 | Lee ......................... C10L 5/00 |
| 2006/0027043 | A1 | * | 2/2006 | Zendejas-Martinez ................... |
| | | | | B01D 53/48 |
| | | | | 75/495 |
| 2006/0075682 | A1 | * | 4/2006 | Bullinger ................. C10L 9/08 |
| | | | | 44/626 |

(Continued)

FOREIGN PATENT DOCUMENTS

| GB | 2 448 531 A | 10/2008 |
| JP | 9-157671 | 6/1997 |

(Continued)

OTHER PUBLICATIONS

State Intellectual Property Office, P.R. China, CPCH1563735P, First Office Action, dated Feb. 23, 2017; Chinese Patent Application No. 2014-80030985.0, dated May 30, 2014 (14 pgs.).

(Continued)

*Primary Examiner* — Gregory L Huson
*Assistant Examiner* — Daniel E Namay
(74) *Attorney, Agent, or Firm* — Nixon & Vanderhye P.C.

(57) ABSTRACT

Process of producing a treated coal and combusting the treated coal, by heating the coal to remove volatiles and drying the product to produce a treated coal containing carbon and hydrogen. The treated coal is combusted by introducing a slipstream of natural gas alongside the treated coal in a quantity sufficient to sustain a stable burn in an industrial boiler configured to burn bituminous coals.

5 Claims, No Drawings

(56) References Cited

U.S. PATENT DOCUMENTS

| | | | |
|---|---|---|---|
| 2006/0123698 A1* | 6/2006 | Hunt | C10B 53/02 44/620 |
| 2006/0248791 A1* | 11/2006 | Hogsett | B01J 8/0065 44/620 |
| 2007/0284108 A1* | 12/2007 | Roes | E21B 36/04 166/302 |
| 2008/0128134 A1* | 6/2008 | Mudunuri | C10G 1/02 166/302 |
| 2008/0222947 A1* | 9/2008 | French | C10F 5/04 44/500 |
| 2010/0178624 A1* | 7/2010 | Srinivasachar | F23K 5/002 431/253 |
| 2011/0290703 A1* | 12/2011 | Colyar | B01D 53/62 208/400 |
| 2012/0023000 A1* | 1/2012 | Rhodes, III | C10L 1/023 705/37 |
| 2012/0056431 A1* | 3/2012 | Bland | C10L 5/366 290/52 |
| 2012/0068120 A1* | 3/2012 | Menzel | C01B 3/02 252/373 |
| 2012/0255224 A1 | 10/2012 | French et al. | |
| 2013/0014441 A1* | 1/2013 | Coolidge | F23K 1/04 48/201 |
| 2013/0040349 A1* | 2/2013 | Heichberger | C12P 7/64 435/134 |
| 2013/0312321 A1* | 11/2013 | Goldberg | F23K 1/00 44/620 |
| 2014/0305034 A1* | 10/2014 | Sakai | C10L 5/04 44/627 |
| 2014/0305035 A1* | 10/2014 | Kim | F23K 1/04 44/629 |
| 2014/0325901 A1* | 11/2014 | Sakai | C10L 5/04 44/627 |
| 2014/0366431 A1* | 12/2014 | Lee | C10L 5/00 44/579 |
| 2015/0038321 A1* | 2/2015 | D'Amico | B01J 20/20 502/56 |
| 2015/0203776 A1* | 7/2015 | Vinegar | E21B 43/24 44/620 |
| 2015/0361367 A1* | 12/2015 | Tait | C10L 5/08 44/590 |
| 2015/0376530 A1* | 12/2015 | Brusletto | F23G 5/027 110/347 |
| 2016/0115412 A1* | 4/2016 | Ponce de Leon | C10L 5/447 431/2 |
| 2017/0137731 A1* | 5/2017 | Hunt | C10L 9/08 |

FOREIGN PATENT DOCUMENTS

| | | |
|---|---|---|
| JP | 2007-17030 | 1/2007 |
| JP | 2009-47390 | 3/2009 |
| JP | 2011-37937 | 2/2011 |
| RU | 1825369 | 6/1993 |
| WO | WO 2004/005428 A1 | 1/2004 |
| WO | WO 2013/066492 A2 | 5/2013 |

OTHER PUBLICATIONS

Dazhong, Li, et al; "Modeling and Engineering Optimization of Compression Process for Biomass Compound Coal Mixed with Sawdust, Rice Hull and Coal"; *Transactions of the Chinese Society for Agriculture Machinery,* vol. 43, No. 4, pp. 82-87 (2012); URL http://en.cnki.com.cn/Article_en/CJFDTotal-NYJX201204018.htm.

Australian Government, IP Australia, Examination Report No. 1 for Standard Patent Application, dated Oct. 9, 2017, Australian Patent Application No. 2014273996 (3 pgs.).

Columbian Office Action No. 5966 issued in Columbian Patent Application No. 15 304.594; Deadline date Jul. 26, 2017 (6 pgs.).

Supplementary European Search Report, issued in Application No. EP 14 80 3703, dated Dec. 5, 2016 (4 pgs.).

Anonymous: "Activated carbon—Wikipedia"; May 18, 2013, XP055326024, Retrieved from the Internet: URL:https://en.wikipedia.org/w/index.php?title=Activated_carbon&oldid=555607327; (18 pgs.).

Anonymous: "Anthracite—Wikipedia"; May 24, 2013, XP055326017, Retrieved from the Internet: URL:https://en.wikipedia.org/w/index.php?title=Anthracite&oldid=556605842; (9 pgs.).

Russian Office Action issued in Appln. No. 2015155730/05 dated Mar. 15, 2018 (w/ translation).

Japanese Office Action issued in Appln. No. 2016-517043 dated Mar. 20, 2018 w/ translation.

\* cited by examiner

TREATMENT OF COAL

This application is the U.S. national phase of International Application No. PCT/US2014/040256 filed May 30, 2014 which designated the U.S. and claims the benefit of U.S. Provisional Application No. 61/829,006 filed May 30, 2013, the entire contents of each of which are hereby incorporated by reference.

The present invention relates to the treatment of coal.

More particularly, the present invention provides a process for treating coal by removing moisture and volatile matter from the coal to produce a fuel product that is free of undesired pollutants that are emitted during the combustion of coal. Any air-borne emissions from the combustion of the fuel product of the invention will be cleaner than those of untreated coal and may obviate post combustion or scrubbing technologies that are typically needed to clean the emissions from a coal-fired burner. The invention results in a less costly solution to the problem of dirty emissions than exists at present.

The invention also seeks to produce a novel feedstock from coal that can serve as a feed material with high carbon content for the activated carbon and carbon electrode industries. The feedstock of the invention also serves as an ideal material for pulverized coal injection (PCI) in blast furnaces in the iron and steel industry.

BACKGROUND OF THE INVENTION

Prior processes for treating coal involve removal of moisture and unwanted volatile matter from the coal (typically low-rank coals and lignite) to produce coal of higher quality, with increased heat release per unit mass of fuel. For example, U.S. Pat. Nos. 6,447,559 and 7,879,117 describe processes for producing a clean coal fuel that has a higher heating value per unit mass of coal, compared to the raw coal.

However, these prior processes were not designed to eliminate all volatile matter. A small portion of the volatiles is retained in order to ensure a stable burn of the treated product in coal-fired boilers.

Anthracite coal is relatively scarce compared to bituminous coal and more costly to burn. To date, no one has developed a process to use it as a fuel, less so as a clean fuel. Anthracite coal is a premium variety of coal that is distinguished for its low volatiles content and low moisture. Its properties make it ideally suited for coke and steel manufacturing. Owing to its unique properties, relative scarcity and several other factors, anthracite coal today commands high prices that are multiples of the prices for other coals. Consequently, notwithstanding that its emissions are far cleaner than the emissions from bituminous or what is commonly referred to a brown or steam coal, anthracite coal is not now, nor anytime in the foreseeable future likely to be used as a fuel for industrial boilers.

The ability therefore to upgrade low rank coals and impart to them some of the major characteristics of premium anthracite coal, together with a solution to the problem of the stability of the burn, has not been addressed. The present invention seeks to address this need.

SUMMARY OF THE INVENTION

In one aspect, there is provided a process for producing a treated coal, whose chemical properties are similar to those of anthracite coal, from any variety of brown or steam coal, including lignite. The resulting treated coal (referred to herein occasionally as Pristine-SA (SA standing for synthetic anthracite)) produced by the process of the invention consists essentially of carbon and hydrogen, and burns as clean as natural gas.

In another aspect there is provided a treated coal consisting essentially of carbon and hydrogen, in which the moisture and volatile matter have been removed to produce a fuel product that is free of undesired pollutants.

In a further aspect, there is provided a compacted product such as a briquette that combines the treated coal of the invention (Pristine-SA) with biomass. Pristine-SA fines are compacted with torrefied biomass (where the torrefied biomass is produced in the same reactors as Pristine-SA, but in a parallel operation) into a solid fuel that can be fed directly into bituminous coal boilers. The proportions of biomass and Pristine-SA are carefully adjusted to provide optimum combustion and flame stability, with minimal boiler fouling. In some instances, a small supplementary stream of a combustible gas may be required to sustain combustion.

In another aspect, the present invention provides a process of combusting the treated coal of the invention with a combustible gas by introducing a slipstream of the combustible gas, for example natural gas, landfill gas or other suitable gas, alongside the treated coal in a quantity sufficient to sustain a stable burn in an existing industrial boiler configured to burn bituminous coals.

DETAILED DESCRIPTION OF THE INVENTION

According to a first aspect of the invention, a process is provided for treating raw coal to free it from inherent and surface moisture followed by the removal of volatile matter. This is accomplished through staged heating under defined temperatures at atmospheric conditions. This process results in a product that can be combusted in boilers configured to burn bituminous coals provided the treated coal is mixed with a supplementary fuel, such as naturally available fuel that can sustain the combustion of the treated coal by increasing the hydrogen; carbon ratio of the two fuels.

Examples of supplementary fuels with high hydrogen content include landfill gas and natural gas, although pure hydrogen may also be used provided its production is commercially viable. The blended fuels comprising the treated coal of the invention and the supplementary fuel produce no toxic emissions and preferably reduced carbon emissions into the atmosphere.

As bituminous coal boilers are typically not equipped to fire two fuels simultaneously, some modifications may be required to enable them to do so. Such modifications include, for example, duel fuel inlets, feed rate controls, and optimal positioning of the fuel inlets for maximum efficiency to sustain combustion.

There is a large number of combined cycle or multi-fuel boilers in the United States and abroad which are able to combust both coal and natural gas individually. The treated coal of the present invention is ideally suited for use in association with these boilers. The present invention thus adds value to both bituminous and sub-bituminous coals and also brings down the cost of compliance with environmental standards when combusting these coals due to their reduced emissions.

In the past, when natural gas prices were relatively high, the co-firing of coal with natural gas to improve combustion did not make economic sense. Today, despite the discovery of natural gas from shale deposits in the U.S., the expectations are that the price of natural gas will continue its gradual increase over time. This is because the increase in the supply of natural gas has already increased its demand over supply of many utilities switching to gas-fired boilers.

Consequently, the much anticipated price drop in natural gas prices may not persist, resulting in a slow-down in the conversion of coal-fired boilers to natural-gas fired boilers. The use of coal in combustion applications will continue as expected or forecasted by recognized domestic and international energy research institutions. For such combustion applications, the treated coal of the invention which has been devolatilized to a low-volatile clean coal that can be co-fired with a supplementary fuel such as natural gas or biogas will be an environmentally superior and economically viable alternative to burning raw coal, natural gas, or biomass separately.

The concept of combining the treated coal of the invention (i.e., coal with near-zero volatiles) with a supplementary fuel such as natural gas in a coal-fired boiler is new. The present invention is ideally suited for use in combined cycle boilers, or multi-fuel boilers that are capable of burning more than one fuel separately or at the same time. While a large population of combined cycle or multi-fuel boilers is in existence, in common use, these boilers are designed to merely switch between one fuel and the other.

The present invention differs from existing methods to remove volatile matter from coal (including coking processes) by using a multistage heating process, typically a two-stage heating process, to break down and remove all moisture and coal-derived volatiles as gases. The heating process employs temperatures in the 900-2500° F. range. These temperatures are higher than those encountered in common processes that remove moisture and volatiles from coal. In the first stage the temperature is raised to a value in the range of 900-1500° F. and, in the second stage, the temperature is further raised to a value between 1500 and 2500° F.

The moisture and volatiles in the gas phase are cooled and condensed in stages into separate streams of water and hydrocarbon liquid byproducts, while conserving the structural integrity of the feed coal to produce the treated coal of the invention. The hydrocarbon byproducts from the process consist of liquids ranging from coal tars and other heavy volatiles to methane, butane, and light aromatics. The commercial value of the liquids is a significant complement to the invention and results in a process whose economic viability is significantly improved.

The time the coal is subject to the staged temperature conditions (the residence times) is longer than in prior processes. Thus, the present Pristine-SA process requires residence times ranging between 15-45 minutes to remove all of the volatile material in coal. Typically, the residence time for the first stage is of the order of 15-20 minutes and the residence time for the second stage is a further 20-25 minutes.

The end product produced by prior processes that remove moisture and volatile material from coal is also different from the Pristine-SA product produced according to the present process. The prior processes produce a solid clean-burning fuel that can sustain its own combustion, whereas the process producing Pristine-SA produces a clean burning solid fuel which is employed in combination with combustible gases. These gases include low-Btu gases derived from refineries and industrial processes that are wastefully flared and biomass.

A further embodiment of the invention comprises Pristine-SA compacted with torrefied biomass such as, for example, torrefied wood or other renewable carbon-neutral energy source subject to torrefaction, and is more energy dense than wood and almost as dense as coal, to give a compacted (briquette) product. While this compacted product can sustain its own combustion, it is different from the products from prior processes in that it exhibits reduced carbon dioxide emissions due to the use of biomass that has zero carbon dioxide emissions. In this regard, it is noted that biomass combustion, by definition, is assumed to produce zero carbon dioxide emissions due to such emissions being offset by the absorption of carbon dioxide as plant growth occurs.

When dealing with coals that contain a high amount of moisture, the present process produces a fuel having a calorific value (CV) higher than what is present in the untreated coal. The increase in CV varies in direct proportion to the moisture content in the coal.

Beyond its use as a cleaner burning fuel, the treated coal of the invention (synthetic anthracite coal) will be an economically attractive alternative to petroleum coke and other similar feedstock for various industries, including activated carbon and carbon electrodes for the aluminum industry as well as carbon additives for the steel industry. Another use for the Pristine-SA treated coal of the invention is in pulverized coal injection (PCI) in a blast furnace. In this respect, the Pristine-SA can act as the preferred carbon source to speed up the reduction of iron ore in a blast furnace during the production of molten iron and reduce the need for coke.

Anthracite coal as a fuel in industrial boilers has only been minimally used owing to high cost, limited availability, and challenges associated with sustaining its combustion. The treated coal of the present invention is almost pure carbon and hydrogen and overcomes the disadvantages noted above. The present invention thus creates an anthracite-like coal that may be sold at a fraction of the cost of natural anthracite and, consequently, may be economically viable as a fuel.

An important aspect of the invention centers on the introduction of a slipstream of supplementary fuel such as natural gas or other combustible gas (e.g., biogas, landfill gas, diesel, etc.,) in a co-current stream alongside the treated coal in an industrial boiler. The supplementary fuel such as natural gas brings with it the required carbon: hydrogen fuel ratio to sustain combustion of the treated coal of the invention. This combination of the treated coal of the invention and the combustible gas ensures a stable burn, and reduces the amount of combustible gas required compared to what would be required if the boiler was operated using the gas alone.

Combustible gases also include those from industrial facilities, oil refineries, and chemical manufacturing plants whose heating value is too low for economical combustion for heat/power production. Consequently, these gases are typically flared thereby wasting their energy content. These combustible gases provide the required hydrogen content to sustain combustion of the treated coal of the invention.

Such process not only improves the quality of low rank coals, but also their emissions are significantly lower and cleaner than the emissions which result from the combustion of untreated bituminous and sub-bituminous steam coals. In addition, emissions scrubbing may be eliminated by the use of the treated coal of the invention due to its near-zero content of materials producing unwanted emissions. In addition, the hydrocarbon byproducts of the process are an important factor, positively impacting the economic viability of the process. The elimination of moisture from the feed coal raises the CV of the coal, making it a more efficient fuel than the untreated coal.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A process of producing a treated coal and combusting the treated coal, which process comprises the steps of:
    heating the coal to remove volatiles and drying the product to produce a treated coal consisting essentially of carbon and hydrogen; and
    combusting the treated coal by introducing a slipstream of natural gas alongside the treated coal in a quantity sufficient to sustain a stable burn in an industrial boiler configured to burn bituminous coals.

2. The process according to claim 1, wherein the process is carried out using a staged heating process to break down and capture volatiles as coal-derived gases.

3. The process of claim 1 wherein the slipstream is introduced co-currently with the treated coal.

4. The process according to claim 1 wherein the combustion is carried out in a combined cycle boiler or a multi-fuel boiler that is capable of burning both fuels separately or at the same time.

5. A fuel product comprising a compacted combination of treated coal produced by the process of claim 1 and torrefied biomass.

* * * * *